(12) United States Patent
Wilson et al.

(10) Patent No.: US 10,682,799 B2
(45) Date of Patent: Jun. 16, 2020

(54) MOLDING SYSTEM WITH BLOW NOZZLE CLEANING

(71) Applicant: DISCMA AG, Hunenberg (CH)

(72) Inventors: Bradley Wilson, Manchester, MI (US); George David Lisch, Jackson, MI (US)

(73) Assignee: DISCMA AG, Zürich (CH)

( * ) Notice: Subject to any disclaimer, the term of this patent is extended or adjusted under 35 U.S.C. 154(b) by 540 days.

(21) Appl. No.: 15/065,157

(22) Filed: Mar. 9, 2016

(65) Prior Publication Data

US 2016/0185029 A1 Jun. 30, 2016

Related U.S. Application Data

(62) Division of application No. 13/721,934, filed on Dec. 20, 2012, now Pat. No. 9,302,421.

(51) Int. Cl.
*B29C 49/46* (2006.01)
*B29C 49/42* (2006.01)
(Continued)

(52) U.S. Cl.
CPC .............. *B29C 49/46* (2013.01); *B29C 49/42* (2013.01); *B29C 49/4273* (2013.01);
(Continued)

(58) Field of Classification Search
CPC . B67C 3/005; B67C 3/001; B29C 2049/4635; B29C 2049/4602;
(Continued)

(56) References Cited

U.S. PATENT DOCUMENTS 3,464,085 A * 9/1969 Burkett .................... B29C 49/04
264/525
3,792,144 A * 2/1974 Burkett et al. .......... B29C 49/04
264/296

(Continued)

FOREIGN PATENT DOCUMENTS

EP 2388125 A2 * 11/2011 ............... A61L 2/04
GB 1312190 A * 4/1973 ............... A61L 2/04
JP 20021772 A 1/2002

OTHER PUBLICATIONS

International Search Report of PCT/IB2012/003033, dated Jun. 26, 2013.

*Primary Examiner* — Xiao S Zhao
*Assistant Examiner* — Ninh V Le
(74) *Attorney, Agent, or Firm* — Eric J. Sosenko; Jonathan P. O'Brien; Honigman LLP

(57) ABSTRACT

A method of forming and filling a container with an end product. Accordingly to the method, a preform is located within a mold assembly that defines the shape of the container and a nozzle assembly is moved so as to engage with at least one of the preform and the mold assembly forming a liquid tight seal. The end product is injected into the preform to simultaneously form a container from the preform and fill the container with the end product. After forming and filling the container, the nozzle assembly, which was used to inject the end product, is disengaged from the preform and/or mold assembly. After the nozzle assembly is disengaged, the filled container is removed from the mold assembly and residual end product is purged from the nozzle assembly.

12 Claims, 3 Drawing Sheets

(51) Int. Cl.

| | |
|---|---|
| *B29C 49/06* | (2006.01) |
| *B29C 49/12* | (2006.01) |
| *B29C 49/28* | (2006.01) |
| *B29C 49/36* | (2006.01) |
| *B29C 49/58* | (2006.01) |
| *B29K 67/00* | (2006.01) |
| *B29K 105/00* | (2006.01) |
| *B29L 31/00* | (2006.01) |

(52) U.S. Cl.
CPC .............. *B29C 49/06* (2013.01); *B29C 49/12* (2013.01); *B29C 49/28* (2013.01); *B29C 49/36* (2013.01); *B29C 49/58* (2013.01); *B29C 2049/4664* (2013.01); *B29C 2049/4694* (2013.01); *B29K 2067/003* (2013.01); *B29K 2105/258* (2013.01); *B29L 2031/7158* (2013.01)

(58) Field of Classification Search
CPC .... B29C 2049/4694; B29C 2049/4664; B29C 49/58; B29C 49/12; B29C 49/06; B29C 49/4273; B29C 49/4284; B29C 49/46; B29C 49/42; B29C 49/36; B29C 48/271; B29L 2031/7158; B29K 2105/258; A61L 2/20; B65B 2210/08

See application file for complete search history.

(56) References Cited

U.S. PATENT DOCUMENTS

| | | |
|---|---|---|
| 2001/0010145 A1 | 8/2001 | Tawa et al. |
| 2004/0159586 A1 | 8/2004 | Dunzinger et al. |
| 2005/0056707 A1* | 3/2005 | Gowens ................ B05B 15/025 239/112 |
| 2006/0213540 A1 | 9/2006 | Gilg et al. |
| 2009/0218733 A1* | 9/2009 | Andison ................ B29C 49/46 264/525 |
| 2010/0089009 A1* | 4/2010 | Till .......................... A61L 2/087 53/452 |
| 2011/0037187 A1 | 2/2011 | Winzinger et al. |
| 2011/0300249 A1 | 12/2011 | Andison et al. |
| 2011/0311675 A1* | 12/2011 | Voth ....................... B29O 49/42 425/526 |

* cited by examiner

MOLDING SYSTEM WITH BLOW NOZZLE CLEANING

CROSS REFERENCE TO RELATED APPLICATION

This application is a divisional of U.S. patent application Ser. No. 13/721,934, filed on Dec. 20, 2012, which claims the benefit of provisional patent application No. 61/578,532, filed on Dec. 21, 2011, the entire contents of which are hereby incorporated by reference.

BACKGROUND

1 Field of the Invention

The present invention generally relates to the blow molding of containers used for containing liquid and viscous products. In particular, the present system relates to blow molding systems where the containers are simultaneously blow molded and filled with the product.

2 Description of Related Art

Plastic containers are commonly used for the packaging of various products, including liquid products and viscous product. One of the most common forms of plastic container is the blow molded plastic container, which is often formed of a polyester material such as polyethylene terephthalate (PET). Blow molded plastic containers are typically formed by placing a heated preform into a blow mold and then inflating the preform with air until the preform contacts the interior surfaces of the mold cavity, which define the final shape of the desired container. Once the inflated preform has been held against the interior surfaces of the mold cavity by the pressure of the blow air for a length of time sufficient to "freeze" the plastic, the molded container is removed from the mold.

The molded containers then transported to the location where the container will be filled with the intended product and labeled. This may include the packaging and shipping of empty containers to a remote location or may involve the transfer of the containers to a local facility where these final steps occur before the finished product is shipped to a retailer or end-user.

With the above method, blow molding and filling are distinct and separate steps in the process of producing a product filled container. A new process involves the use of the product itself in the blow molding of the container. Instead of utilizing air as the blowing medium, this new process utilizes the liquid or viscous product that is to be retained within the container as the blowing medium. The container is therefore simultaneously blow molded and filled. As used herein, this type of molding is referred to as liquid blow molding or hydraulic molding.

In traditional blow molding, after the heated preform has been placed in the mold cavity, a stretch rod is often advanced within the preform to longitudinally stretch the preform before any significant radial expansion of the preform is undertaken. The stretch rod will typically remain within the preform during radial expansion, and is retracted prior to removal of the resultant container.

One concern of hydraulic molding is the contamination of the preform since product is immediately introduced into the preform during the hydraulic molding process. Since the stretch rod and blow nozzle are in contact with product used to hydraulically mold the container, there is a concern that residual product on the stretch rod or blow nozzle may become contaminated over time. Additionally, there is the possibility that residual product on the stretch rod or nozzle may be drip onto a heated preform, prior to dispensing of the hydraulic blowing medium, and that contact of this residual product with the heated preform may result in a local portion of the preform exhibiting defects after hydraulic molding. One possible defect is a cosmetic discoloration of the resultant container. Another, more significant defect is that the molded container may experience blow out, wherein a hole is formed in the container during the hydraulic molding process, resulting in the hydraulic blowing medium coming into contact with the interior surfaces of the mold and requiring extensive cleaning of the mold cavity. A hydraulic molding machine would obviously experience significant down time during the resultant cleaning process.

SUMMARY

In satisfying the above need, as well as overcoming the enumerated drawbacks and other limitations of the related art, in one aspect the present invention provides a method of forming and filling a container with an end product. The method includes locating a heated preform within a mold assembly that defines the shape of the container, engaging a portion of a blow nozzle assembly with the preform, introducing the end product into the preform under pressure to simultaneously form the container from the preform and fill the container with the end product, disengaging the portion of the blow nozzle assembly from the preform after forming of the container, removing the filled container from the mold assembly, and discharging and directing a stream of cleaning medium toward the blow nozzle assembly after the disengaging step, whereby residual end product is removed from the blow nozzle assembly.

In another aspect, the purging step includes directing a stream of cleaning medium towards the nozzle assembly.

In further aspect, the step of directing the stream of cleaning medium is performed on an intermittent basis.

In an additional aspect, the step of directing the stream of cleaning medium includes directing one of a gas and liquid towards the nozzle assembly.

In another aspect, the step of directing the stream of cleaning medium includes directing one of air, nitrogen and $CO_2$ towards the nozzle assembly.

In still another aspect, the step of directing the stream of cleaning medium includes directing a sanitizing agent towards the nozzle assembly.

In yet a further aspect, the step of injecting the end product includes the step of injection one of a viscous material and a liquid.

In an additional aspect, the purging step is performed after the removing step.

In yet another aspect, the purging step is performed before a further step of locating another preform within the mold assembly.

In a further aspect, the purging step includes the step of circumferentially moving the mold assembly about a molding station and radially outwardly directing a stream of cleaning medium towards the nozzle assembly.

In still a further aspect, the purging step includes the step of circumferentially moving a blow-off nozzle with the mold assembly and directing the stream of cleaning medium from the blow-off nozzle.

In an additional aspect, the purging step includes the step of circumferentially moving the mold assembly while maintaining a blow-off nozzle stationary and directing the stream of cleaning medium from the blow-off nozzle.

In another aspect, the purging step includes the step of sequentially discharging different agents towards the nozzle assembly.

In a further aspect, one of the different agents is a rinsing agent discharged after another of the different agents.

In an additional aspect, the step of sequentially discharging the different agents includes discharging the different agents through a common nozzle.

In still another aspect, the method further includes the step of collecting the residual end product after the purging step.

In yet a further aspect, the method of forming and filling the container is a hydraulic blow molding process.

Further objects, features and advantages of this invention will become readily apparent to persons skilled in the art after a review of the following description, with reference to the drawings and claims that are appended to and form a part of this specification.

DETAILED DESCRIPTION

Figure 1:
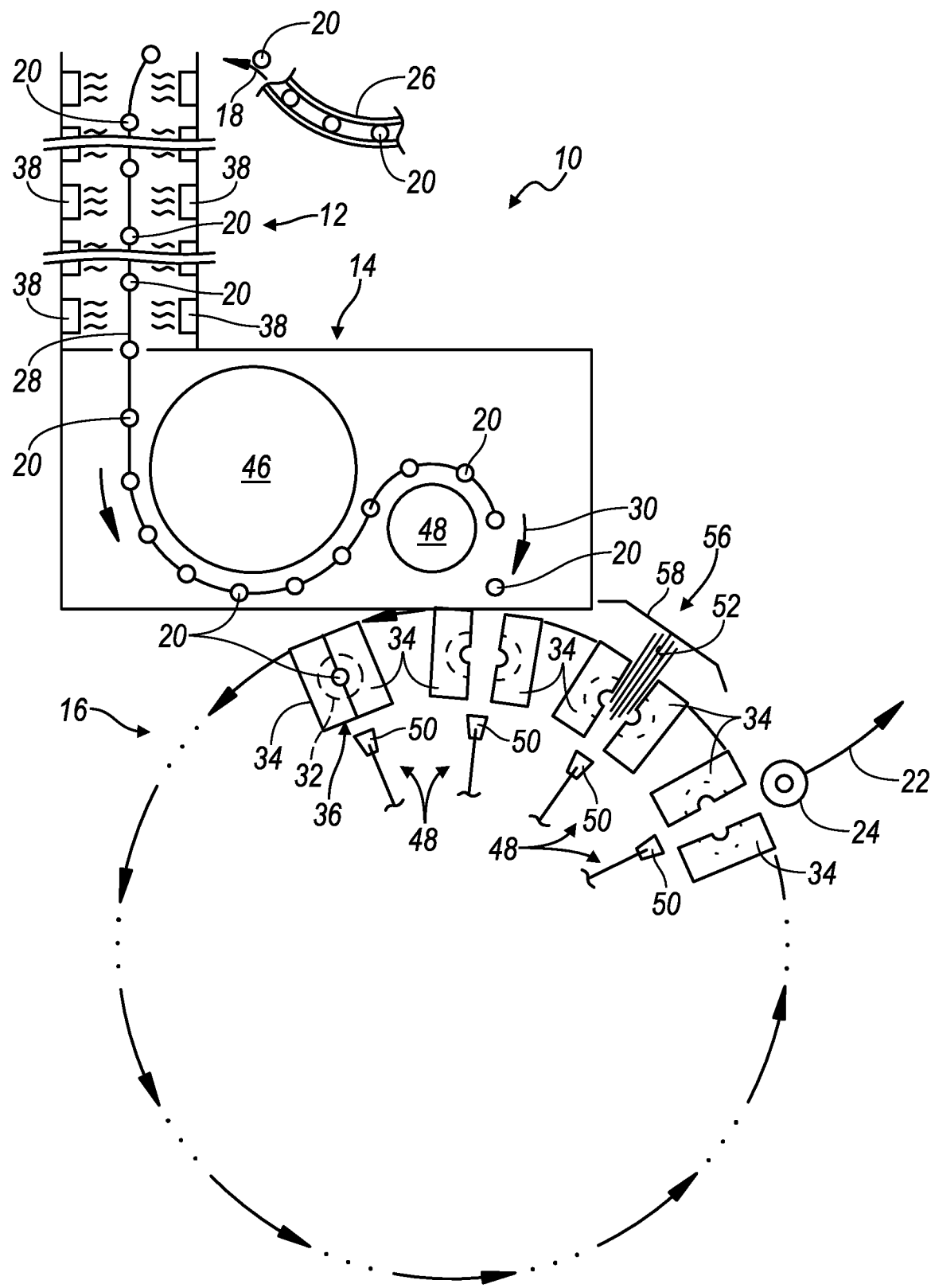
FIG. 1 schematic illustration of a hydraulic blow molding system incorporating the principles of the present invention.

Referring now to the drawings, a hydraulic blow molding system embodying the principles of the present invention is generally illustrated in FIG. 1 and designated at 10. As its primary components, the system 10 includes an oven or heating station 12, a transfer station 14 and a hydraulic blow molding station 16. Additionally, the system 10 includes an in-feed station 18 for introducing preforms 20 into the oven 12 and an out-feed station 22 for removing formed and filled containers 24 from the hydraulic blow molding station 16.

Generally, preforms 20 are provided to the system 10 at the in-feed station 18 by way of a rail or other transport mechanism 26. The preforms 20 are then individually loaded onto a conveyor 28, which transports the preforms 20 through the oven 12 and the transfer station 14, and finally to a mold loading station 30. To secure the preforms 20 on the conveyor 28, the conveyor may utilize carrier or spindle assemblies (not shown) that are connected to or supported by the conveyor 28.

The oven 12 includes a plurality of heaters 38 spaced along the length of the oven 12. The heaters 38 heat the material of the preforms 20 to a point where the preforms 20 are susceptible to hydraulic blow molding.

From the oven 12, the heated preforms 20 are transferred by the transfer station 14 to the hydraulic blow molding station 16. Various configurations can be envisioned for the transfer station 14. In the illustrated configuration, the transfer station 14 utilizes a primary transfer wheel 46 that is coupled to the conveyor 28 to receive the preforms from the oven 12. A secondary transfer wheel 48 is also used, in conjunction with the primary transfer wheel 46, to position and facilitate transferring of the heated preforms 20 into the mold cavities 32 at the mold loading station 30.

At the mold loading station 30, each preform 20 is removed from its carrier assembly and placed within a mold cavity 32. A slide actuator or robotic arm (not shown) may be used to facilitate the transfer of the preforms 20 from the conveyor 28 into the mold cavities 32. Since such transfer mechanisms are known in the field of blow molding, further details of these mechanisms are not described herein.

Each mold cavity 32 is defined by interior surfaces 33 of opposing mold halves 34 of a mold assembly 36, and multiple mold assemblies 36 are provided at the hydraulic molding station 16. However, the actual number of mold assemblies 36 at the hydraulic molding station 16 can and will vary depending on the specific design of the system 10 and the hydraulic molding station 16. For example, in the rotary-style molding station 16 generally seen in FIG. 1, the number of mold assemblies 36 may range anywhere from four to forty, or even more.

Figure 2:
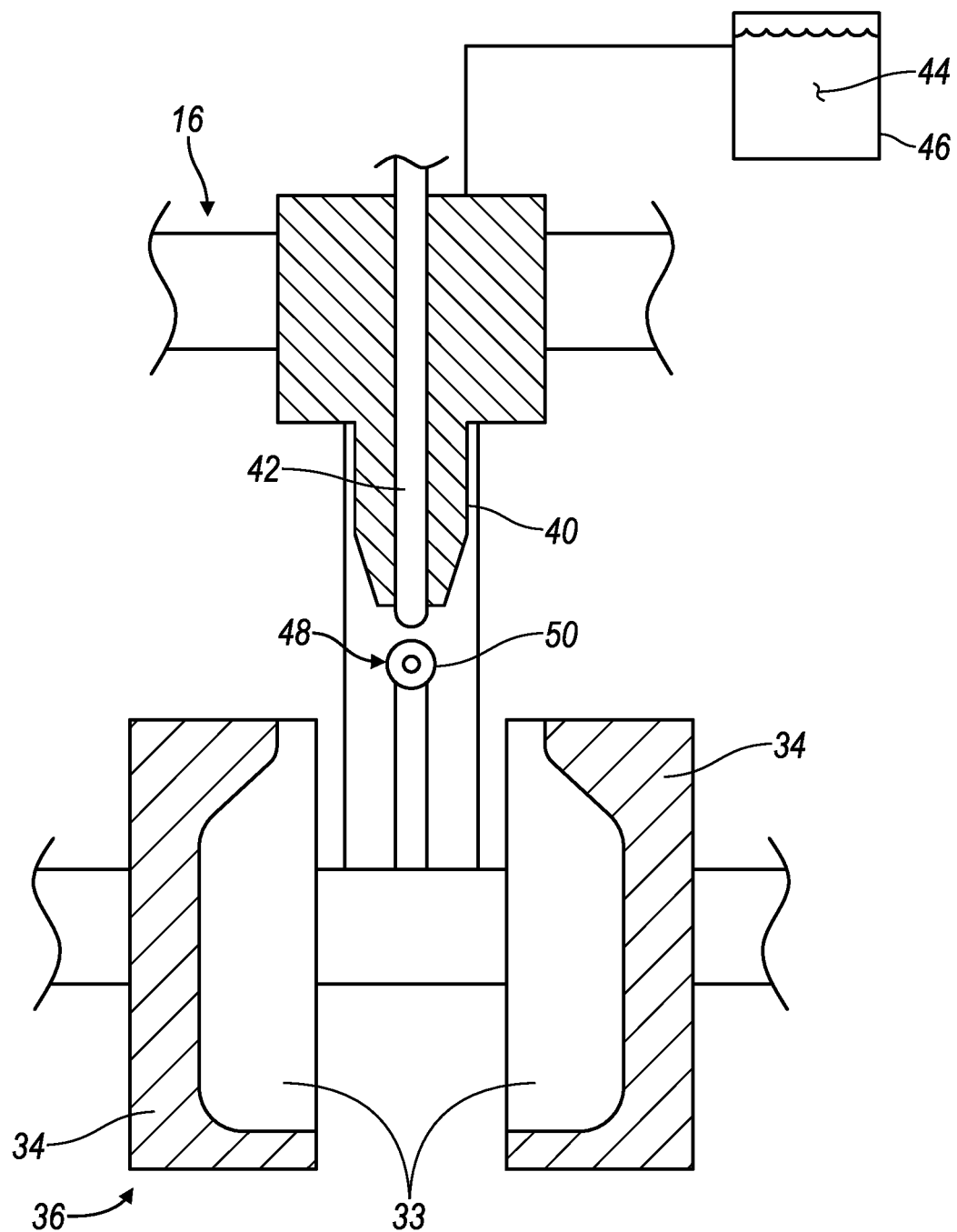
FIG. 2 is a radially inward schematic view of a blow-off nozzle at one molding station of the system seen in FIG. 1.
Figure 3:
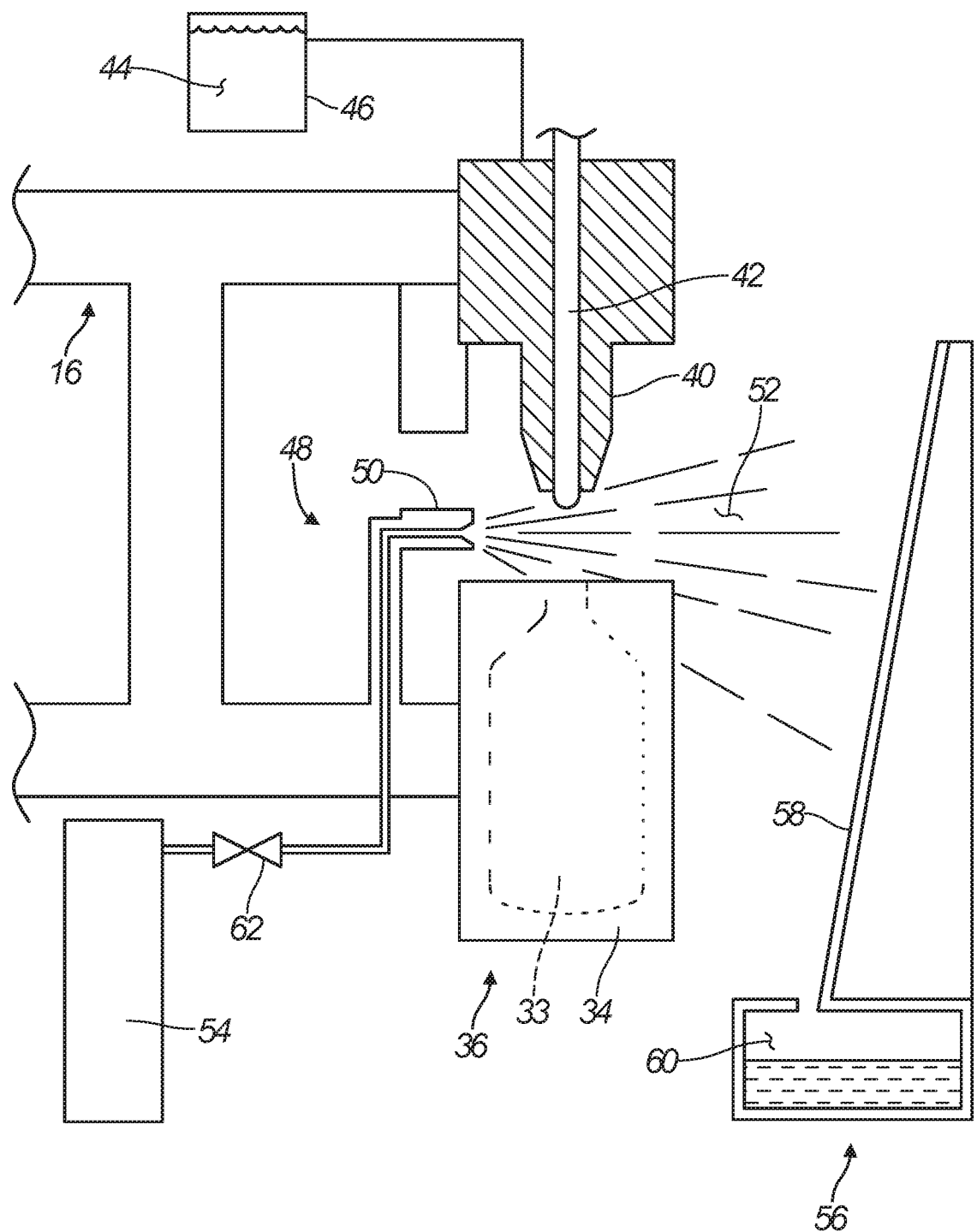
FIG. 3 is a side schematic view of the blow-off nozzle and molding station seen in FIG. 2.

Once the heated preform 20 is positioned in the mold cavity 32, an actuator (not shown) closes the mold halves 34 about the heated preform 20, thereby entrapping the heated preform within the mold assembly 36. A nozzle assembly 40, seen in FIGS. 2 and 3, is brought into sealing engagement with the finish (the threaded end portion) of the preform 20 by an actuator (not shown). A stretch rod 42 may then be extended by another actuator (not shown) through the nozzle assembly 40 and into the preform 20. During extension, the stretch rod 42 engages the closed end of the preform 20 and axially elongates the preform 20. Simultaneously with, or subsequent to, actuation of the stretch rod 40, a hydraulic blowing medium 44 is introduced under pressure, through the nozzle assembly 40, into the preform 20. The pressure of the hydraulic blowing medium 44 causes the preform 20 to radially expand until it is forced into conformity with the interior surfaces 33 of the mold cavity 32, thereby molding the preform 20 substantially into the final shape of the container 24. Since the molding process of the system 10 is a hydraulic molding process, the hydraulic blowing medium 44 is the actual liquid or viscous product (a non-gaseous product) that is to be packaged within the resulting container 24. To facilitate this process, the blowing medium 44 is provided from a product source 46 that is coupled to the nozzle assembly 40. Accordingly, the container 24 is simultaneously formed and filled.

After an appropriate time in contact with the interior surfaces 33 of the mold cavity 32, the mold halves 34 are opened and the formed and filled container 24 is removed from the mold assembly 36 at the out-feed station 22. The transfer of the formed and filled container 24 from the mold assembly 36 at the out-feed station 22 is performed by another transfer mechanism, such as a robotic arm or slide actuator. Again, such transfer mechanisms are known in the blow molding industry and need not be further discussed herein.

From the out-feed station 22, the formed and filled container 24 is transferred to a sealing/capping station (not shown) where a seal, a cap or both are applied. At this point, the filled and capped container 24 may be subsequently transferred to a labeling station (not shown) where labeling is applied.

Because the preform 20 is hydraulically molded with a blowing medium 44 that is in a liquid or viscous form (a non-gaseous form), it is possible that a residual amount of the hydraulic blowing medium 44 will remain on some of the components in the blow molding station 16. For example, a residual amount of the hydraulic blowing medium 44 may be found on the nozzle assembly 40 and the stretch rod 42, particularly where the stretch rod 42 was extended into the preform 20 while the hydraulic blowing medium 44 was being forced into the preform 20. As previously noted, it is possible that some residual blowing medium 44 might become contaminated and, if it is introduction into the preform 20 during a subsequent blowing sequence, it might result in contamination of the product in the container 24. Also as previously noted, the residual blowing medium may be at a different temperature than the actual hydraulic blowing medium 44. If the residual blowing medium happens to contact the heated preform 20 prior to the introduction of the actual blowing medium 44, it is possible that the cooler residual blowing medium could affect the thermal properties of the preform 20 and the subsequent molding of the container 24. As an example, the effect may be a cosmetic defect in the clarity of the container or, more drastically, a hole formed in the expanding preform through which the hydraulic blowing medium 44 escapes.

To reduce the risk of contamination of the product and the formation of defects on the resultant container 24, a system 10 incorporating the principles of the present invention includes a blow-off system 48 for removing/cleaning residual hydraulic blowing medium from various components of the system 10. Generally, the blow-off system 48 employs a blow-off nozzle 50 associated with each of the mold assemblies 36. The blow-off nozzle 50 delivers a stream or blast, designated at 52, of a cleaning medium across the various components at risk of having residual blowing medium thereon. Accordingly, the blow-off nozzle 50 directs the stream 52 across at least the nozzle assembly 40 and any associated components, including the stretch rod 42, a seal pin (not designated), portions of the mold assemblies 36 and other components.

In a preferred embodiment, at least one blow-off nozzle 50 is associated with each mold assembly 36. The blow-off nozzle 50 may be fixed in location relative to the mold assembly 36 or it may articulate to effectuate cleaning/removal. In a rotary hydraulic molding station 16, such as that seen in FIG. 1, the blow-off nozzle 50 will preferably rotate with its associated mold assembly 36, but stay a fixed relationship relative to the mold assembly. Alternatively, one or more non-rotating blow-off nozzles 50 could be provided so that, during operation of the rotary hydraulic molding station 16, the blow-off nozzle 50 does not rotate, but is stationarily fixed while the mold assemblies 36 are rotated past the blow-off nozzle 50 to effectuate cleaning and removal of any residual hydraulic blowing medium. In an in-line molding station (not shown) is another configuration, and in that configuration, the blow-off nozzles 50 will also remain stationary.

Regardless of the embodiment, each provided blow-off nozzle 50 is coupled to a source of the cleaning medium, which may be pressurized. In FIG. 3, the source of cleaning medium is generally designated at 54. Preferably, the cleaning medium is provided in a sterilized gas form, such as but not limited to air, nitrogen or $CO_2$. Alternatively, the cleaning medium may include or be a sterilizing agent, such as hydrogen peroxide, etc. Where a sterilizing agent is used, the application of the sterilizing agent may additionally be followed by the application of a rinsing agent, which may be the sterilized gas mentioned above. In this latter embodiment, the sterilizing agent and rinsing agents may be provide sequentially from the same blow-off nozzle, or may be provided from separate blow-off nozzles, each respectively coupled to one of the sterilizing/rinsing agent sources.

In the rotary hydraulic molding station 16 of the figures, the blow-off nozzles 50 are directed radially outward of the hydraulic molding station 16. Directing the blow-off nozzles 50 in this manner ensures that residual blowing medium, when cleaned from the components of the station 16, is not further dispersed onto other components of the molding station 16. In order to further limit inadvertent spraying or further contamination of other portions of the system 10, the removal and cleaning of residual hydraulic blowing medium from the various components occurs during only a portion of the hydraulic molding cycle. More specifically, the removal/cleaning of the residual hydraulic blowing medium occurs after a filled and formed container 24 has been removed from a mold assembly 36, but before the next preform 20 is placed in that mold assembly 36.

Immediately after a filled container 24 has been removed from the mold assembly 36, the mold halves 34 are open and the nozzle assembly 40 is spaced apart therefrom. During the time from the removal of the filled container 24 until the introduction of the next preform 20 therein, the stream 52 of cleaning medium is projected from the blow-off nozzle 50 so as to "air" wash the component at which it is directed. The force of the stream 52 is of sufficient strength such that any residual hydraulic blow medium on the subject components is completely and effectively dislodged and directed to a collection unit 56.

The collection unit 56 can take any one of a variety of forms so long as it effectively captures the residual hydraulic blowing medium. In a simple construction, the collection unit 56 may include a collection shield 58 onto which the residual hydraulic blowing medium is directed. Such a collection shield 58 may be oriented in an upright manner so that once on the shield 58, the residual hydraulic blowing medium travels downward under the influence of gravity, along the shield 58, and is directed into a collection reservoir 60 in the base of the collection unit 54. The shield 58 itself may have a variety of shapes and forms including being formed of a single flat-panel, a series of angled flat panels, or as a curved panel.

Where blow-off nozzles 50 are associated with each of the mold assemblies 36, a valve 62 controls intermittent providing of the cleaning medium. The valve 62 may be operated such that the cleaning medium is only discharged through the blow-off nozzle 50 during the time when the nozzle assembly 40 is disengaged from the mold assembly 36, the filled container 24 has been removed from the mold assembly 36, and before the next preform 20 is placed therein. Operation of the blow-off system 48 is therefore anticipated as occurring in the latter stages of rotation of the rotary hydraulic molding station 16, generally between the out-feed station 22 and the mold loading station 30. In an in-line hydraulic molding system, this would occur after take-out of the filled container 24 and prior to introduction of the next preform 20. Operation of the valve 62 can therefore be controlled by the electronic controller (not shown) operating the system 10, which may be wireless, to ensure precise actuation and timing of the delivery of the stream 52 of cleaning medium.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A method of forming and filling a container with an end product, the method comprising steps of:
   locating a preform within a mold assembly defining a shape of the container;
   engaging a nozzle assembly with at least one of the preform and the mold assembly to form a liquid tight seal;

injecting the end product under pressure from the nozzle assembly into the preform to simultaneously form a container from the preform and fill the container with the end product;

disengaging the nozzle assembly from at least one of the container and the mold assembly after forming of the container;

removing the container filled with the end product from the mold assembly; and after both disengaging of the nozzle assembly from at least one of the container and the mold assembly and removing of the container filled with end product from the mold assembly, purging residual end product from the nozzle assembly, the purging of the residual end product including circumferentially rotating a blow-off nozzle with the mold assembly with the blow-off nozzle being positioned radially inward of the mold assembly and oriented to direct a stream of purging medium radially outward and toward the nozzle assembly.

2. The method of claim 1, wherein the step of directing the stream of purging medium is performed on an intermittent basis.

3. The method of claim 1, wherein the step of directing the stream of purging medium includes directing one of a gas and liquid towards the nozzle assembly.

4. The method of claim 1, wherein the step of directing the stream of purging medium includes directing one of air, nitrogen, and $CO_2$ towards the nozzle assembly.

5. The method of claim 1, wherein the step of directing the stream of purging medium includes directing a sanitizing agent towards the nozzle assembly.

6. The method of claim 1, wherein the step of injecting the end product includes the step of injection one of a viscous material and a liquid.

7. The method of claim 1, wherein the purging step is performed before a further step of locating another preform within the mold assembly.

8. The method of claim 1, further comprising the step of collecting the residual end product after the purging step.

9. The method of claim 1, where the method of forming and filling the container is a hydraulic blow molding process.

10. A method of forming and filling a container with an end product, the method comprising steps of:

locating a preform within a mold assembly defining a shape of the container;

engaging a nozzle assembly with at least one of the preform and the mold assembly to form a liquid tight seal;

injecting the end product under pressure from the nozzle assembly into the preform to simultaneously form a container from the preform and fill the container with the end product;

disengaging the nozzle assembly from at least one of the container and the mold assembly after forming of the container;

removing the container filled with the end product from the mold assembly; and after both disengaging of the nozzle assembly from at least one of the container and the mold assembly and removing of the container filled with end product from the mold assembly, purging residual end product from the nozzle assembly, the purging of the residual end product including circumferentially rotating a blow-off nozzle with the mold assembly with the blow-off nozzle being positioned radially inward of the mold assembly and oriented to direct a stream of purging medium radially outward, wherein the purging step includes the step of sequentially discharging different agents towards the nozzle assembly.

11. The method of claim 10, wherein one of the different agents is a rinsing agent discharged after another of the different agents.

12. The method of claim 10, wherein the step of sequentially discharging the different agents includes discharging the different agents through a common nozzle.

* * * * *